US009083422B2

United States Patent
Coon

(10) Patent No.: US 9,083,422 B2
(45) Date of Patent: Jul. 14, 2015

(54) WIRELESS COMMUNICATIONS METHODS AND APPARATUS

(75) Inventor: Justin Coon, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 316 days.

(21) Appl. No.: 13/524,466

(22) Filed: Jun. 15, 2012

(65) Prior Publication Data

US 2012/0322362 A1 Dec. 20, 2012

(30) Foreign Application Priority Data

Jun. 17, 2011 (GB) .................................. 1110366.0

(51) Int. Cl.
*H04B 1/60* (2006.01)
*H04B 7/155* (2006.01)

(52) U.S. Cl.
CPC ........ *H04B 7/15557* (2013.01); *H04B 7/15564* (2013.01); *H04B 7/15592* (2013.01)

(58) Field of Classification Search
CPC . H04W 52/242; H04W 40/22; H04W 84/047; H04W 88/04; H04B 7/15557; H04B 7/15592; H04B 7/15564
USPC ............. 455/7, 11, 1, 15, 13.1, 22, 23, 422.1, 455/403, 445, 550.1, 500, 517, 426.1, 455/426.2, 67.11, 423–425, 67.16, 412.1, 455/412.2; 370/310, 315, 317, 323
See application file for complete search history.

(56) References Cited

U.S. PATENT DOCUMENTS

2014/0078955 A1* 3/2014 Nagaraja .................. 370/315

FOREIGN PATENT DOCUMENTS

| JP | WO2010/067524 A1 | 6/2010 |
| JP | 2011-504007 A | 1/2011 |
| JP | 2011-91501 A | 5/2011 |
| JP | 2011-120015 A | 6/2011 |

OTHER PUBLICATIONS

Office Action issued Jan. 7, 2014 in Japanese Patent Application No. 2012-135567 (with English language translation).
Office Action issued Oct. 13, 2011 in UK Patent Application No. 1110366.0, filed Jun. 17, 2011.
(Continued)

*Primary Examiner* — Keith Ferguson
(74) *Attorney, Agent, or Firm* — Oblon, McClelland, Maier & Neustadt, L.L.P.

(57) ABSTRACT

A method of relaying a signal in a wireless communications network comprising a plurality of wireless devices, the method being performed by at least one of said wireless devices to relay a signal in a communication path between one of said plurality of wireless devices and another one of said wireless devices, the method comprising receiving a signal from said one of said plurality of wireless devices, determining channel statistical information relating to a part or the whole of said wireless communications network, selecting a mode of relaying said signal from a plurality of predetermined relay modes based on said determined channel statistical information, such that the outage probability for said communication path satisfy a predetermined condition, and transmitting said signal to said another one of said plurality of wireless devices using said selected mode.

15 Claims, 8 Drawing Sheets

(56) References Cited

OTHER PUBLICATIONS

JiangBo SI, et al., "Joint Optimization of Relay Selection and Power Allocation in Cooperative Wireless Networks," Communication Systems, 2008, ICCS 2008, 11th IEEE Singapore International Conference, pp. 1264-1268, Nov. 19-21, 2008.

Behrouz Maharn, et al., "Efficient Cooperative Protocols for General Outage-Limited Multihop Wireless Networks," 2010 IEEE 21th International Symposium on Personal indoor and Mobile Radio Communications, pp. 145-150, Sep. 26-30, 2010.

Jie Yang, et al., "The Effect of Receiver Diversity Combining on Optimum Energy Allocation and Energy Efficiency of Cooperative Wireless Transmission Systems", Proc of ICASSP 2007, vol. 3, pp. III-493-III-496, Apr. 15-20, 2007.

Yu Dong, et al., "Optimal Power Allocation for Cooperative Networks," 2010 Second International Conference on Communication Software and Networks, ICCSN 2010, pp. 183-167, Feb. 26-28, 2010.

* cited by examiner

WIRELESS COMMUNICATIONS METHODS AND APPARATUS

FIELD

Embodiments described herein relate generally to wireless communications via a relay station in a wireless communications network.

BACKGROUND

Recently, wireless relay networks have become an area of popular research. This is due to their ability to extend communication coverage, increase channel capacity, and improve link reliability. There are two types of relaying strategies: (1) decode-and-forward (DF) relay, whereby a received signal is decoded, re-encoded, and forwarded by a relay station, and (2) amplify-and-forward (AF) relay, whereby a received signal is simply amplified and forwarded to another wireless device or another relay station in the network. The DF scheme is generally used in dedicated relay stations (e.g. relay stations operating in 3GPP LTE-Advanced and IEEE 802.16j systems) which can afford the complexity involved under the DF scheme. However, the AF scheme is generally preferred for battery operated devices as such devices usually have their own data to transmit and the complexity of relaying operation needs to be kept to a minimum (e.g. nodes in smart grid and sensor networks).

The AF relay scheme can be further categorised into fixed gain amplification and variable gain amplification. The difference between these two categories is that fixed gain amplification is based on the average received channel power while variable gain amplification is based on the instantaneous received channel power. In a multi-hop AF network with a single relay path, the variable gain AF relaying scheme significantly outperforms the fixed gain AF relaying scheme. However, in the variable gain AF relaying scheme, channel estimation needs to be performed by each of the relay node in order to determine the instantaneous channel state information (CSI). Such a relay node is also commonly referred to as a CSI-assisted AF relay. Therefore, compared to a fixed gain AF relay node, the computation complexity at a variable gain AF relay node is significantly higher due to the need for channel estimation. Fixed gain AF relaying scheme (also generally known as non-regenerative relay scheme) has been widely applied in low complexity systems, such as emerging energy and utility management applications as well as industrial wireless sensor networks.

DESCRIPTION OF THE DRAWINGS

Embodiments will now be described with reference to the accompanying drawings, in which.

DETAILED DESCRIPTION

Figure 1:
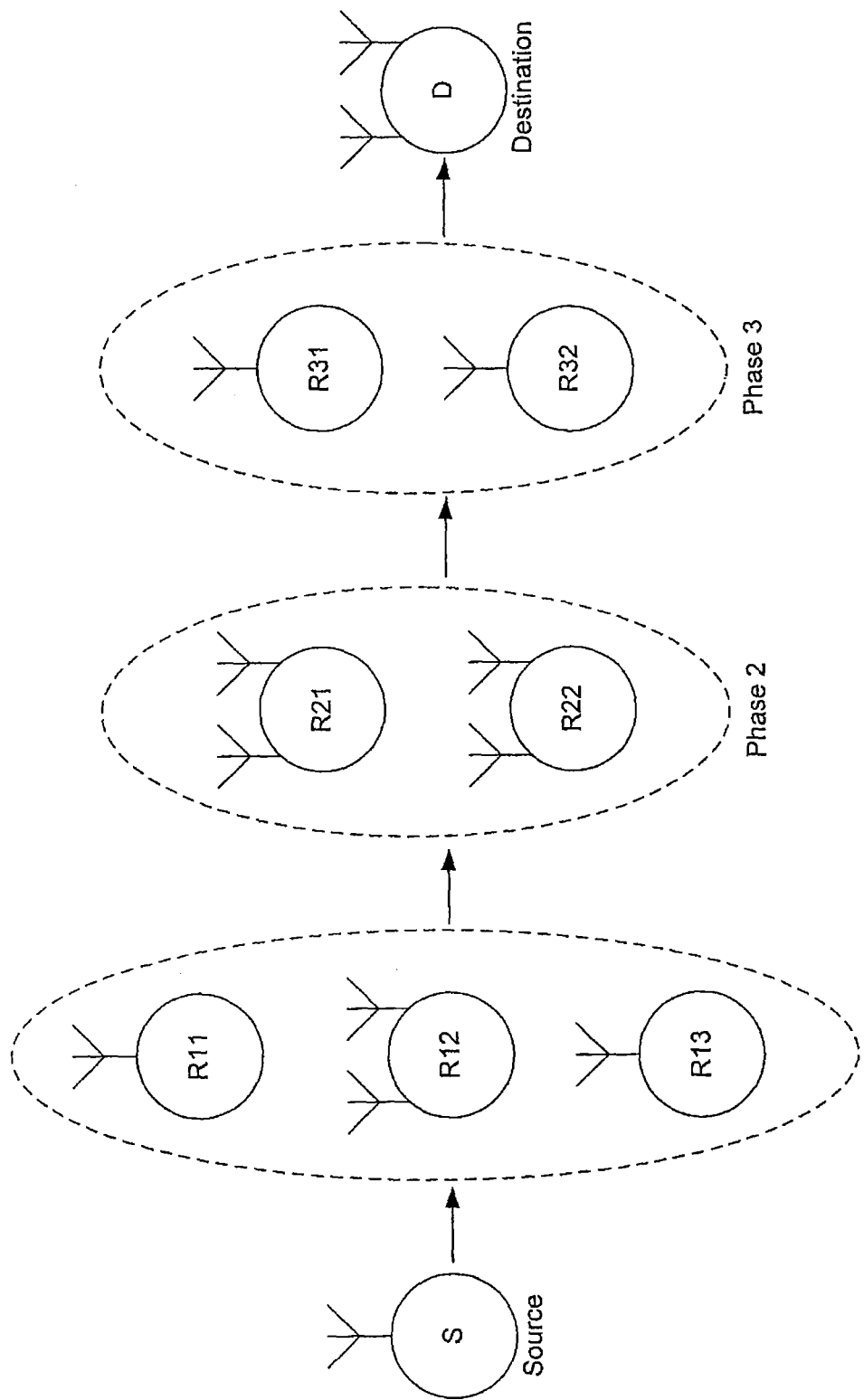
FIG. 1 illustrates a multi-hop relay network according to an embodiment.

Specific embodiments will be described in further detail in the following paragraphs on the basis of the attached figures. It will be appreciated that this is by way of example only, and should not be viewed as presenting any limitation on the scope of protection sought.

In an embodiment there is provided a method of relaying a signal in a wireless communications network comprising a plurality of wireless devices, the method being performed by at least one of said wireless devices to relay a signal in a communication path between one of said plurality of wireless devices and another one of said wireless devices, the method comprising receiving a signal from said one of said plurality of wireless devices, determining channel statistical information relating to a part or the whole of said wireless communications network, selecting a mode of relaying said signal from a plurality of predetermined relay modes based on said determined channel statistical information, such that the outage probability for said communication path satisfy a predetermined condition, and transmitting said signal to said another one of said plurality of wireless devices using said selected mode.

The step of selecting said mode of relaying said signal may be performed such that at least one parameter of said wireless communications network is optimised, subject to a constraint on the outage probability.

Where there is provided at least one further communication path to relay said signal from said one of said plurality of wireless devices to said another one of said plurality of wireless devices, the method may further comprise the step of selecting said at least one further communication path if said at least one further communication path satisfy a further predetermined condition, subject to a constraint on the outage probability.

In one embodiment, there is provided a step of performing a joint relay with a yet further one of said plurality of wireless devices based on a confidence level defining whether the outage probability for said communication path to satisfy said predetermined condition can be maintained by said at least one of said wireless devices.

In another embodiment, the method may further comprise determining a delay based on said confidence level, wherein said delay defines a time interval in which said at least one of said wireless devices decides whether said joint relay with said yet further one of said plurality of wireless devices is required.

The mode of relaying said signal may include any one of the following modes:

(a) maximum ratio transmission or reception combining;
  (b) radio frequency or digital beamforming;
  (c) localised or distributed space-time coding; or
  (d) repetition coding According to another embodiment there is provided a relay device for relaying a signal in a wireless communications network comprising a plurality of wireless devices, the relay device being configured to relay said signal in a communication path between one of said plurality of wireless devices and another one of said plurality of wireless devices, the relay device comprising a receiver for receiving a signal from said one of said plurality of wireless devices, means for determining channel statistical information relating to a part or the whole of said wireless communications network, a selector for selecting a mode of relaying said signal from a plurality of predetermined relay modes based on said determined channel statistical information, such that the outage probability for said communication path satisfy a predetermined condition, and a transmitter for transmitting said signal to said another one of said plurality of wireless devices using said selected mode.

The selector may be configured to select a mode of relaying said signal such that at least one parameter of said wireless network is optimised, subject to a constraint on the outage probability.

Where there is provided at least one further communication path to relay said signal from said one of said wireless devices to said another one of said plurality of wireless devices, said selector may be configured to select said at least one further communication path if said at least one further communication path satisfy a further predetermined condition subject to a constraint on the outage probability.

In one embodiment, the relay device may be further configured to perform a joint relay with a yet further one of said plurality of wireless devices based on a confidence level defining whether the outage probability for said communication path to satisfy a predetermined condition can be maintained by said relay device.

In another embodiment, the relay device may further comprise means for determining a delay based on said confidence level, wherein said delay defines a time interval in which said relay device decides whether said joint relay with said yet further one of said plurality of wireless devices is required.

The mode of relaying said signal may include any one of the following modes:
 (a) maximum ratio transmission or reception combining;
 (b) radio frequency or digital beamforming;
 (c) localised or distributed space-time coding; or
 (d) repetition coding According to another embodiment there is provided a wireless communication system comprising a plurality of wireless devices, wherein at least one of said plurality of wireless devices is operable to relay a signal between one of said plurality of wireless devices and another one of said plurality of wireless devices over a communication path, and said at least one of said wireless devices comprises a receiver for receiving a signal from said one of said plurality of wireless devices, means for determining channel statistical information relating to a part or the whole of said wireless communications network, a selector for selecting a mode of relaying said signal from a plurality of predetermined relay modes based on said determined channel statistical information, such that the outage probability for said communication path satisfy a predetermined condition, and a transmitter for transmitting said signal to said another one of said plurality of wireless devices using said selected mode.

One embodiment provides a computer program product comprising computer executable instructions which, when executed by a computer, cause the computer to perform a method as set out above. The computer program product may be embodied in a carrier medium, which may be a storage medium or a signal medium. A storage medium may include optical storage means, or magnetic storage means, or electronic storage means.

The described embodiments can be incorporated into a specific hardware device, a general purpose device configure by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

Multi-hop relay networks have received a considerable amount of attention recently for applications such as cellular networking and smart meter ICT (Information and Communications Technology) infrastructures. A simplified illustration of a multi-hop relay network with a single relay path is shown in FIG. 1. In this example, the number of hops (or phases), N, is 4, and the number of relay nodes, N−1, is 3. In FIG. 1, each illustrated circle in each column represents a node in the network. Each column represents different phases of relaying a signal from the source node, S, through the relay nodes, (R11, R12, or R13), (R21 or R22), and (R31 or R32), to the destination node, D. Although it is illustrated in this example that direct communications are established between adjacent nodes, the skilled person would appreciate that direct communications can also be established between non-adjacent nodes.

Each node has the capability to transmit and/or receive signals using one of several physical layer modulation, coding, diversity combining, precoding, and power loading schemes. The method used for receiving and forwarding a signal at each relay node is herein referred to as the relay forwarding/reception mode. Furthermore, it is appreciated that there could be more than one relay route available between the source node and destination node. Thus, a routing protocol can be provided to determine a suitable route for relaying a signal from the source node to the destination node.

As will be described in the forthcoming paragraphs, the relay forwarding/reception modes and the routing protocols can be selected based on the conditions of the wireless communications network. One example of the wireless communications network condition is the end-to-end outage probability of the network.

As shown in FIG. 1, there are $b_n$ relay(s) available at the $n^{th}$ phase of the multi-hop network. Each of the $j^{th}$ relays in the $n^{th}$ phase are provided with $t_{n,j}$ transmit antennas and $r_{n,j}$ receive antennas. In this example, the number of transmit antennas and the number of receive antennas at each relay nodes are equal, i.e. $t_{n,j}=r_{n,j}$. Additionally, the transmit antennas at the source node, S, is denoted as $t_0$, and the receive antennas at the destination node, D, is denoted as $r_{N+1}$. Therefore, in the multi-hop relay network of FIG. 1, where N=4, $b_1$=3, $b_2$ $b_3$=2, $t_0=t_{1,1}=t_{1,3}=t_{3,1}=t_{3,2}=1$, $t_{1,2}=t_{2,1}=t_{2,2}=r_4=2$, and $t_{n,j}=r_{n,j}$.

In FIG. 1, a signal is generated and transmitted from the source node, S, to one of the first relay nodes, R11, R12, and R13, in phase 1. Once the signal is received by one of the first relay nodes, the signal is processed and forwarded to the next adjacent node, R21 or R22, in phase 2. The same process continues until the signal is received by the destination node, D.

In this example, it is assumed that each of the relay nodes has the capability of obtaining channel statistical information corresponding to the links between various nodes in the communications network. It will be appreciated by the person skilled in the art that any suitable method of the obtaining the channel statistical information may be employed, and therefore details of obtaining the channel statistical information by the relay node will not be described.

According to one embodiment, the channel statistical information are used to select a suitable forwarding/reception mode at each phase such that the end-to-end outage probability of the communication link between the source node and the destination node meets a predetermined criteria or threshold.

In one embodiment, a non-regenerative relay scheme is employed, i.e. each relay node receives a signal, amplifies it by a fixed gain, and transmits the amplified signal to a relay node in the next relay phase. Such a relay scheme is herein referred to as the fixed gain amplify-and-forward relay scheme (FAF). Under such a scheme, the end-to-end outage probability can be expressed as:

$$p_{out} \approx c_N \prod_{n=1}^{N} P_n \quad (1)$$

where $c_N$ is a constant dependent upon N, and $P_n$ denotes the $n^{th}$ link's contribution to the end-to-end outage probability.

A person skilled in the art would understand that the end-to-end outage probability, $P_{out}$, in Equation (1) can be factored in the N terms (denoted herein as separability property), i.e. one for each hop in the network to allow a suitable forward/reception mode to be selected independently at each phase.

The end-to-end outage probability at high CINR for homogeneous FAF networks experiencing the most common fading processes are provided in the equations below. Homogeneity is defined herein as the condition where all hops in the network experience fading of the same type, but do not necessarily have the same distributional parameters (for example, all hops may experience Nakagami-m fading, where the shape parameter $m_n$ is the same for each hop, but the scale parameter $\theta_N$ differs for each hop).

$$P_{Nakagami} \approx \frac{\rho^m}{(N-1)!m\Gamma(m)^N \prod_n \theta_n^m A_{n-1}^{2m}} \cdot \frac{(\log\gamma)^{N-1}}{\gamma^m} \quad (2)$$

$$P_{Weibull} \approx \frac{\rho^m m^{N-1}}{(N-1)! \prod_n \theta_n^m A_{n-1}^{2m}} \cdot \frac{(\log\gamma)^{N-1}}{\gamma^m} \quad (3)$$

$$P_{Rician} \approx \frac{\rho \prod_n (K_n+1) e^{-K_n}}{(N-1)! \prod_n \theta_n A_{n-1}^2} \cdot \frac{(\log\gamma)^{N-1}}{\gamma} \quad (4)$$

$$P_{Hoyt} \approx \frac{\rho \prod_n (1+q_n^2)}{(N-1)! \prod_n 2q_n \theta_n A_{n-1}^2} \cdot \frac{(\log\gamma)^{N-1}}{\gamma} \quad (5)$$

where m and $\theta_n$ denote the shape and scale parameters respectively for the respective fading distributions, $K_n$ denotes the Rician K-factor (i.e. a ratio of a channel gain corresponding to a dominant path to an average channel gain of subdominant scattered paths), $A_n$ is the fixed amplification factor for the $n^{th}$ relay (and $A_0=1$ is the source amplification factor), $q_n$ (with $0 \le q_n \le 1$) is the Hoyt q parameter, $\rho$ is the outage threshold (if the end-to-end CINR does not meet this threshold, the system will be in outage), and $\gamma$ is the average per hop CINR.

It will be appreciated that more general expressions for the outage probability for heterogeneous networks are available. However, the expressions above provide an illustration of the separability property of the outage probability in FAF networks.

In another embodiment, a regenerative relay scheme is employed, i.e. each relay node receives a signal, decodes it using an appropriate decoding technique, re-encodes and amplifies it with a gain (fixed or variable), and transmits the amplified signal to a relay node in the next relay phase. Such a regenerative relay scheme is herein referred to as the decode-and forward (DF) relay scheme. In a wireless communications network that employs a DF relay scheme, the end-to-end outage probability, $P_{out}$, can be expressed as:

$$P_{out} = 1 - \prod_{n=1}^{N} (1 - P_n) \quad (6)$$

where $P_n$ denotes the outage probability of the $n^{th}$ communication link. It is noted the separability property also applies for the DF relay scheme. Thus, an appropriate forwarding/reception mode or a suitable relay route can be selected to minimise the end-to-end outage probability by considering each hop independently. For example, in a Rayleigh fading single-input single-output channel, the $P_n$ and the corresponding $P_{out}$ can be expressed as follows:

$$P_n = 1 - e^{-\frac{\rho}{\mu_n}} \quad (7)$$

$$P_{out} = 1 - \prod_{n=1}^{N} e^{-\frac{\rho}{\mu_n}} \quad (8)$$

where $\mu_n$ denotes the mean fading gain of the $n^{th}$ channel and $\rho$ is the outage threshold.

Figure 2:
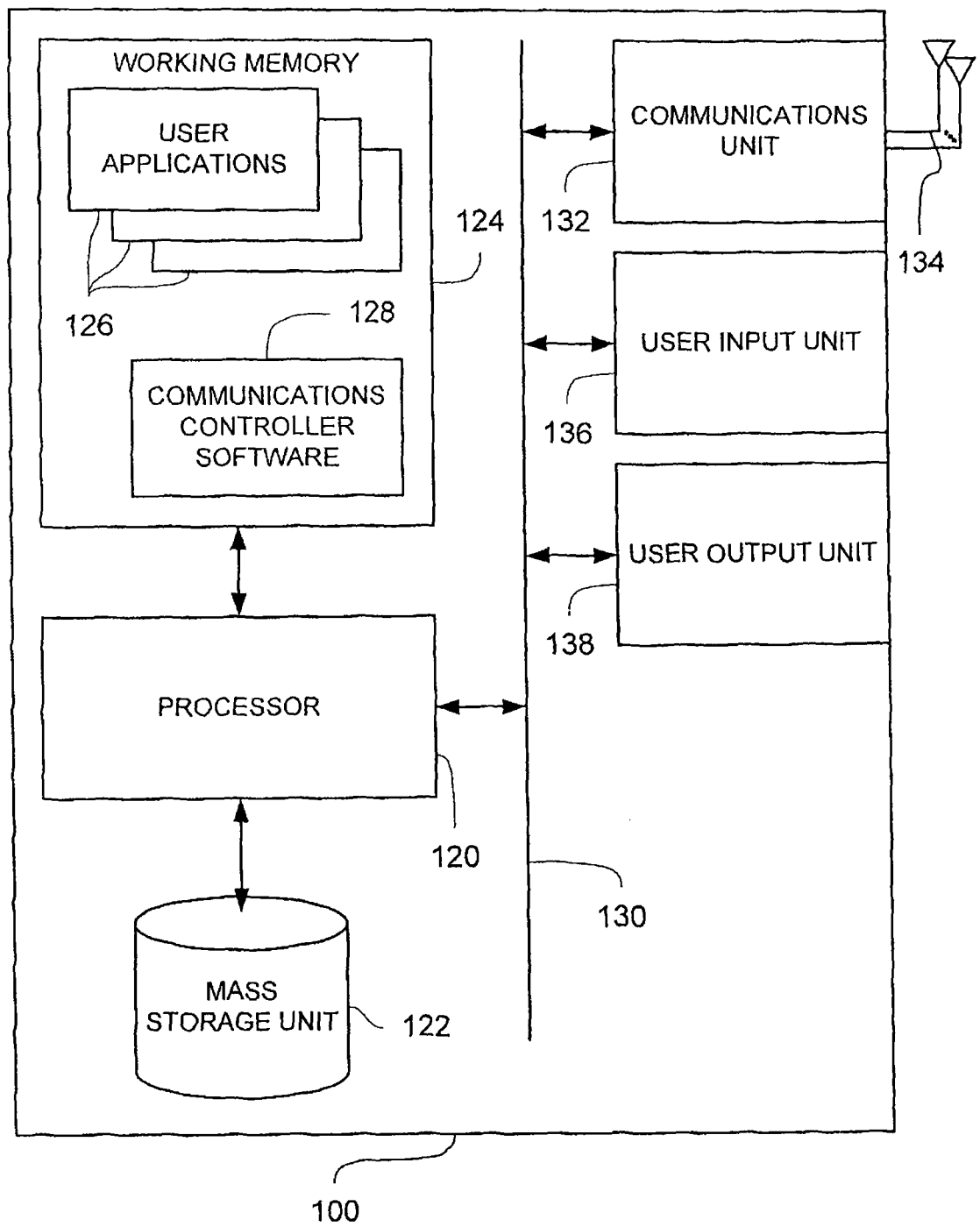
FIG. 2 illustrates an exemplary relay station incorporating an embodiment.

FIG. 2 illustrates schematically hardware operably configured (by means of software or application specific hardware components) as a relay device 100.

The relay device 100 illustrated in FIG. 2 is generally capable of being used to establish a communications channel with one or more other devices and, in accordance with a specific embodiment. The reader will appreciate that the actual implementation of the relay device is non-specific, in that it could be any communication device such as a base station or a user terminal.

The device 100 comprises a processor 120 operable to execute machine code instructions stored in a working memory 124 and/or retrievable from a mass storage device 122. By means of a general purpose bus 130, user operable input devices 136 are capable of communication with the processor 120. The user operable input devices 136 comprise, in this example, a keyboard and a mouse though it will be appreciated that any other input devices could also or alternatively be provided, such as another type of pointing device, a writing tablet, speech recognition means, or any other means by which a user input action can be interpreted and converted into data signals.

Audio/video output hardware devices 138 are further connected to the general purpose bus 130, for the output of information to a user. Audio/video output hardware devices 138 can include a visual display unit, a speaker or any other device capable of presenting information to a user.

Communications hardware devices 132, connected to the general purpose bus 130, are connected to antennas 134. In the illustrated embodiment in FIG. 2, the working memory 124 stores user applications 126 which, when executed by the processor 120, cause the establishment of a user interface to enable communication of data to and from a user. The applications in this embodiment establish general purpose or specific computer implemented utilities that might habitually be used by a user.

Communications facilities 128 in accordance with the specific embodiment are also stored in the working memory 124, for establishing a communications protocol to enable data generated in the execution of one of the applications 126 to be processed and then passed to the communications hardware devices 132 for transmission and communication with another communications device. It will be understood that the software defining the applications 126 and the communications facilities 128 may be partly stored in the working memory 124 and the mass storage device 122, for convenience. A memory manager could optionally be provided to enable this to be managed effectively, to take account of the possible different speeds of access to data stored in the working memory 124 and the mass storage device 122.

On execution by the processor 120 of processor executable instructions corresponding with the communications facilities 128, the processor 120 is operable to establish communication with another device in accordance with a recognised communications protocol.

While the communications facilities 128 are illustrated as a distinct software element, the reader will appreciate that software can be introduced to a computer in a number of different ways. For instance, a computer program product, consisting of a storage medium could be introduced to a computer, so that stored instructions can then be transferred to the computer. Equally, a signal could be sent to the computer bearing such instructions. Furthermore, in introducing a computer program product, the reader will appreciate that a piece of software may be composed of a number of components, some of which may be new, and others of which may be assumed to be provided in the computer already. For instance, a computer might be reasonably assumed to be supplied with an operating system of known type, and a computer program may be developed on the basis of the presence of such an operating system. The interaction between the computer program developed in that way, and facilities of the operating system, would lead to the definition of a communications facilities element such as illustrated in FIG. 2. Thus, any computer program product may be developed as a new, stand-alone product, or as a plug-in to existing products.

Relay Forwarding/Reception Modes

It is noted that a number of forwarding/reception modes are possible given various degrees of statistical channel knowledge in the relay network. Examples of relay forwarding/reception modes include, but not limited to, the following:

maximum ratio transmission or receiver combining;
radio frequency (RF) or digital beamforming;
localised or distributed space-time coding; and
repetition coding.

Figure 3:
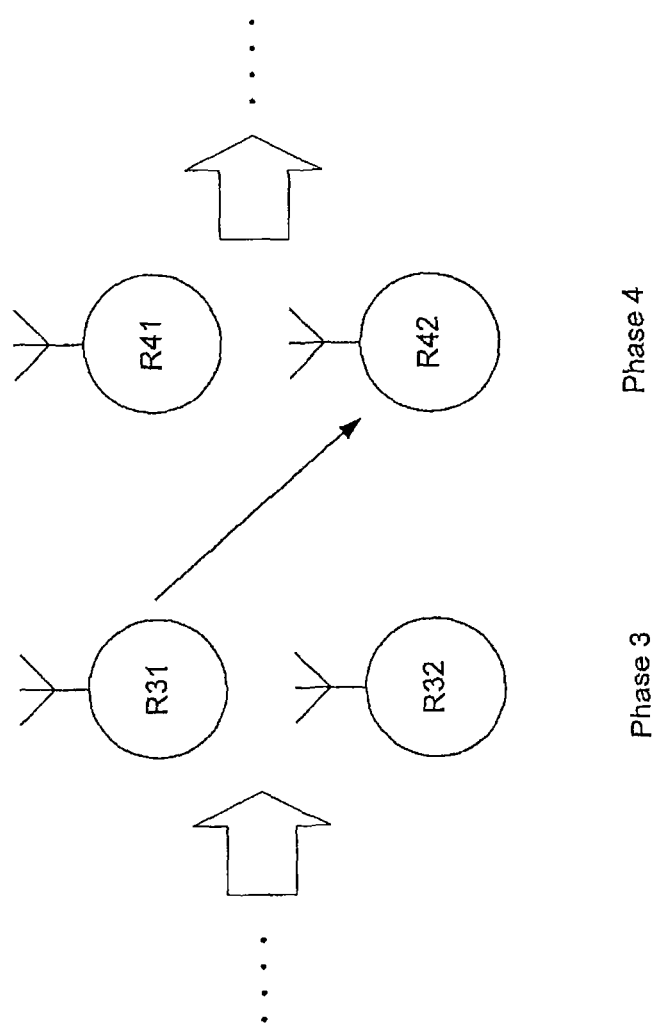
FIG. 3 illustrates a signal being relayed from one phase to another phase according to an embodiment.
Figure 4:
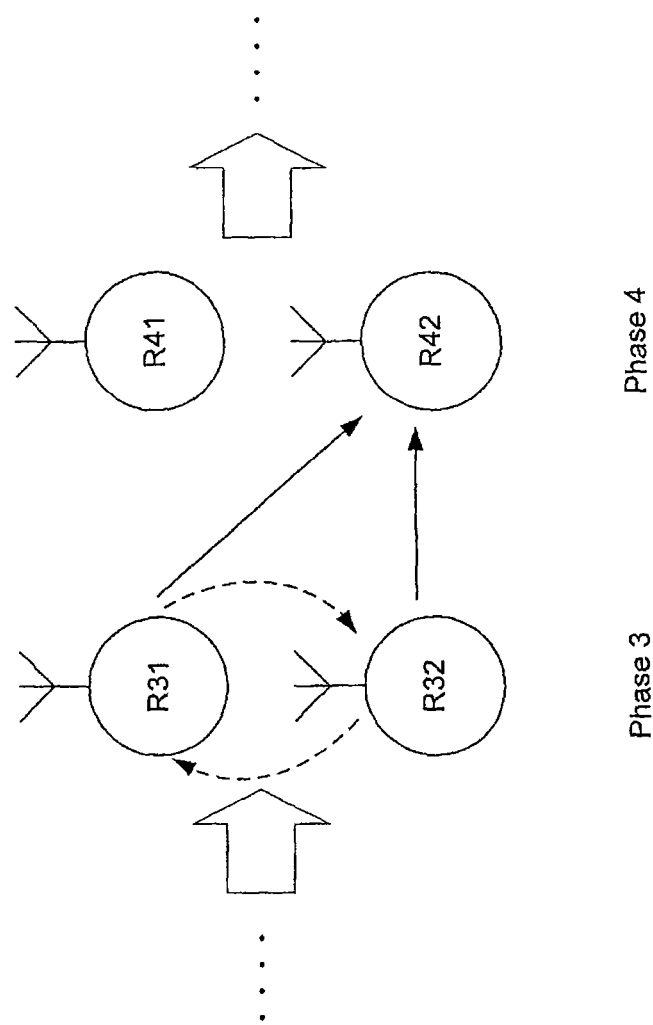
FIG. 4 illustrates a signal being relayed from one phase to another phase according to another embodiment.

It is noted that each of the above forwarding/reception modes result in different outage performance characteristics. In effect, these modes could alter the channel characteristics of the network. For example, referring to FIG. 3, if a relay node, R31, with one antenna in relay phase, n=3, transmits a message through a non-line-of-sight (NLOS) channel that experiences a large amount of scattering to a single relay node, R42, that has one antenna in phase, n=4, the underlying channel statistics will follow a Rayleigh fading model with a certain mean channel gain. However, as shown in FIG. 4, if two relay nodes, R31 and R32, (each with a single antenna) cooperate in relay phase, n=3, to encode the message using a space-time block code (for example, Alamouti's code) and then convey this encoded message to a single-antenna node, R42, in relay phase, n=4, the resulting equivalent channel statistics will follow a Nakagami-m fading model, where m=2 is the shape parameter in this case. Alternatively, a beamforming approach would potentially result in a statistical channel model that resembles a Rician distribution.

Selecting Relay Forwarding/Reception Modes Using Global Statistical Knowledge

In an embodiment, each node in each relay phase has a global knowledge of the channel statistical information throughout the relay network. This allows an optimisation procedure to be carried out in order to select a suitable forwarding/reception mode at each phase. Thus, the utilisation of the system resources (such as the number of nodes used at each phase) can be minimised, subject to a maximum allowable outage probability. Alternatively, the total power transmitted in the network could also be minimised, subject to a constraint on the outage probability.

In one example, the objective is to minimise the end-to-end outage probability, and the statistics of the fading channels for the inter-phase links in the network have been obtained by the relay nodes in the network. The channel power for each link, in this example, follows a Rayleigh fading (i.e. Nakagami-1) profile. The relay nodes at each relay phase cooperate with each other to encode a message using a space-time block code prior to transmission and to decode a signal using maximum ratio receiver combining (MRRC), such that a more favourable equivalent channel statistics than the Rayleigh fading (i.e. Nakagami-m, where m>1) can be achieved to facilitate communications with a lower outage probability.

Figure 5:
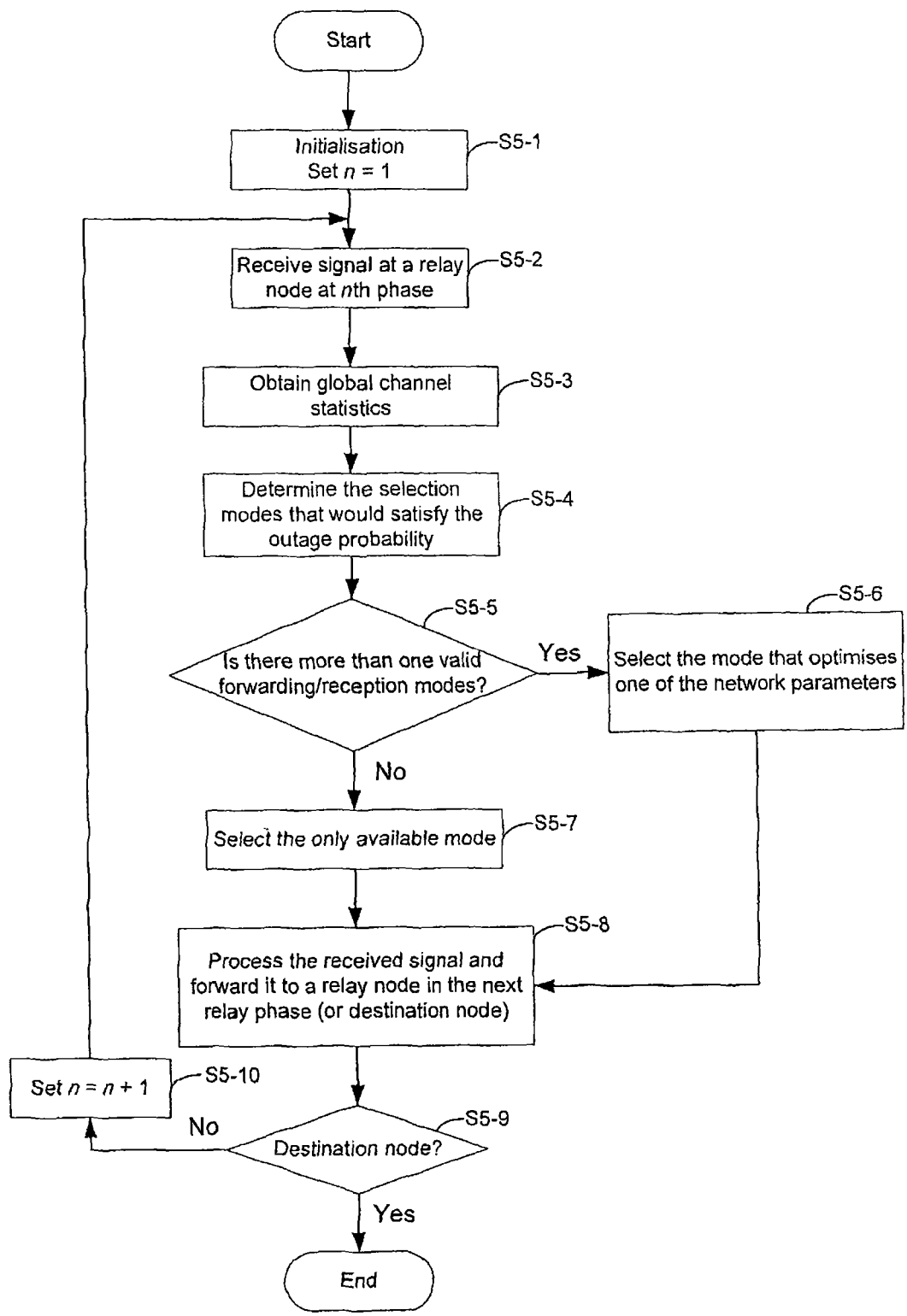
FIG. 5 illustrates the steps of selecting a forwarding/reception mode according to an embodiment.

FIG. 5 illustrates the steps of relaying a received signal in a multi-hop communications network according to the above embodiment.

Step S5-1: Initialise the relay phase, n=1.

Step S5-2: The method commences when a signal is received by a relay node at the $n^{th}$ phase.

Step S5-3: Determine the global channel statistical information throughout the relay network.

Step S5-4: Based on the determined channel statistical information obtained in Step S5-3, determine the reception and forwarding modes that will achieve the target end-to-end outage probability constraint, for all the relay phases throughout the network.

Step S5-5: Determine whether more than one forwarding/reception modes that satisfy the target end-to-end outage probability constraint are available.

If yes, the following step will be performed:

Step S5-6: Select the mode that optimises at least one of the network parameters. For example, the mode that also allows the least number of resources (for example, relay nodes) to be utilised at the current phase.

Otherwise, perform step S5-7 to select the only available mode.

Step S5-8: Process the received signal and forward it to the next node using the selected forwarding/reception mode.

Step S5-9: Check whether the subsequent node is a destination node. Otherwise, perform step S5-10 and repeat steps S5-2 to S5-8.

Selecting Relay Forwarding/Reception Modes Using Local Statistical Knowledge

In this example, each of the relay nodes at a relay phase obtains information of the channel statistics corresponding to the link between its current relay phase and a preceding phase, and the link between it current phase and a subsequent phase. The selection of relay forwarding/reception modes is performed sequentially, in phases, from the first relay phase to the relay phase prior to the destination node.

In one embodiment, the selection of the forwarding/reception mode at a given phase is performed by assuming that all the relay phases have the same statistical properties as the current phase. It is further assumed that every phase uses the same forwarding/reception mode. An appropriate forwarding/reception mode is then selected to achieve the target end-to-end outage probability. In an event that more than one forwarding/reception modes that satisfy the outage probability requirement are available, one option is to select the mode that results in the least number of resources (for example, relay nodes) being utilised. It will be appreciated by the skilled person that other options are also available.

Figure 6:
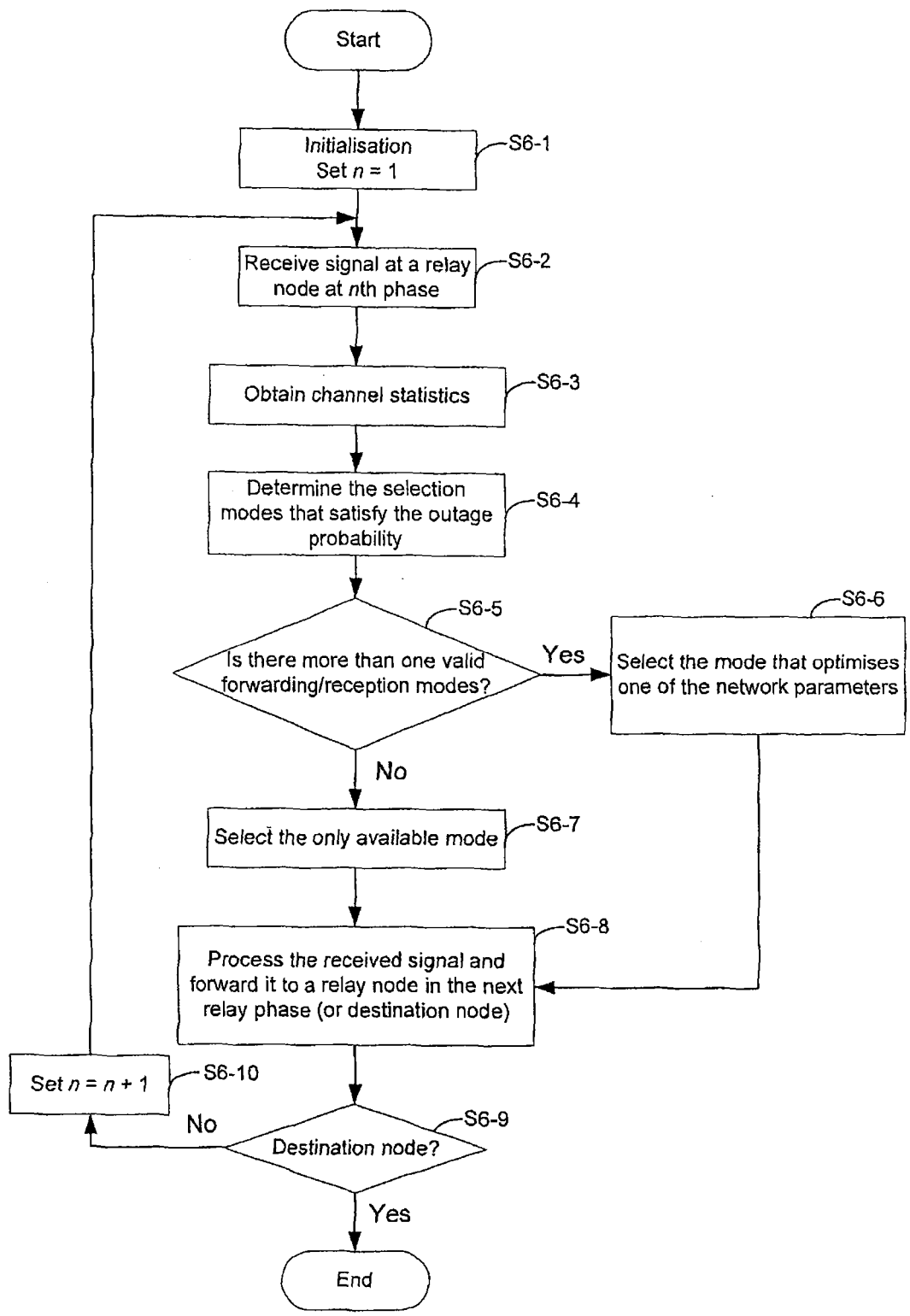
FIG. 6 illustrates the steps of selecting a forwarding/reception mode according to another embodiment.

FIG. 6 illustrates the step of relaying a received signal in a multi-hop communications network according to above described embodiment.

Step S6-1: Initialise the relay phase, n=1.

Step S6-2: The method commences when a signal is received by a relay node at the nth phase.

Step S6-3: Determine the channel statistical information for the communication links between the $(n-1)$th and $n^{th}$ relay phase, and the $n^{th}$ and $(n+1)^{th}$ relay phase.

Step S6-4: Based on the determined channel statistical information obtained in Step S6-3, determine the reception and forwarding modes that will achieve the target end-to-end outage probability constraint, assuming that all preceding and subsequent channel statistics are identical to those obtained at the current relay phase.

Step S6-5: Determine whether more than one forwarding/reception modes that satisfy the target end-to-end outage probability constraint is available.

If yes, the following step will be performed:

Step S6-6: Select the mode that optimises at least one of the network parameters. For example, the mode that also allows the least number of resources (for example, relay nodes) to be utilised.

Otherwise, perform step S6-7 to select the only available mode.

Step S6-8: Process the received signal and forward it to the next node.

Step S6-9: Check whether the subsequent node is a destination node. Otherwise, perform step S6-10 and repeat steps S6-2 to S6-8.

Cooperation Between Relay Nodes in the Same Phase

As described in the preceding paragraphs, relay nodes in a relay phase can also cooperate with each other to select a suitable forwarding/reception mode. Prior to cooperating with each other, the relay nodes will first decide whether the required end-to-end outage constraint can still be met without any cooperation. Therefore, at each phase, a short period of "reserved" time is provided upon reception of a signal to allow the relay nodes to decide whether such cooperation is required, whereby each node in the current phase will forward the received signal after a delay.

In one embodiment, the delay is determined based on a level of confidence that the received signal can be forwarded without such cooperation and yet still satisfy the required end-to-end outage probability constraint. Thus, a short delay can be allocated to a relay node with a high level of confidence, such that the relay node can forward the received signal before other relay nodes in the same relay phase, thereby resulting in efficient transmission.

Accordingly, a confidence level, $c_j \geq 0$, for the j th node at a relay phase can be defined. The delay, $d_j$, is defined as being inversely proportional to $c_j$. An illustration of such an ordered delay approach is illustrated in FIG. 6. FIG. 6 illustrates an example of four relay nodes in the same relay phase, wherein $c_2 > c_1 > c_3 > c_4$. Thus, the relationship between the delays of the respective relay nodes is $d_2 < d_1 < d_3 < d_4$. Alternatively, the delays imposed on each relay node could also follow a pseudorandom pattern.

Selecting a Route Through the Multi-Hop Communications Network

Figure 7:
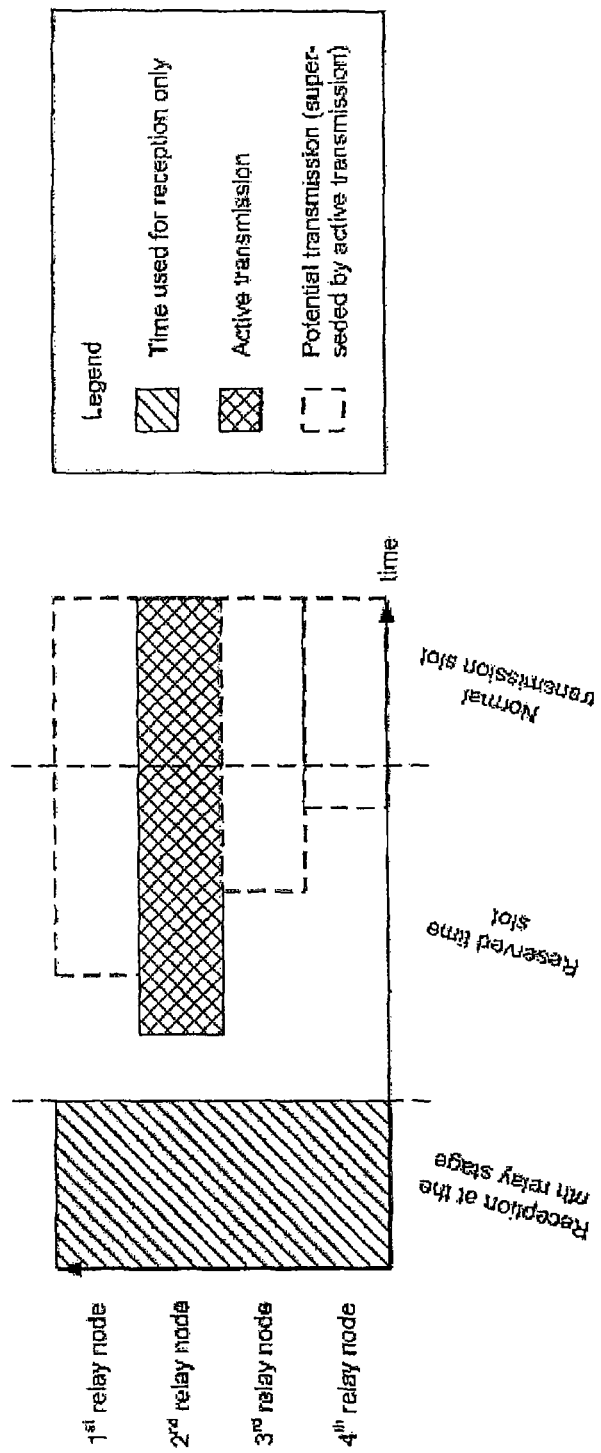
FIG. 7 illustrates a comparison graph of a delay being imposed on each of the relay nodes in a relay phase.
Figure 8:
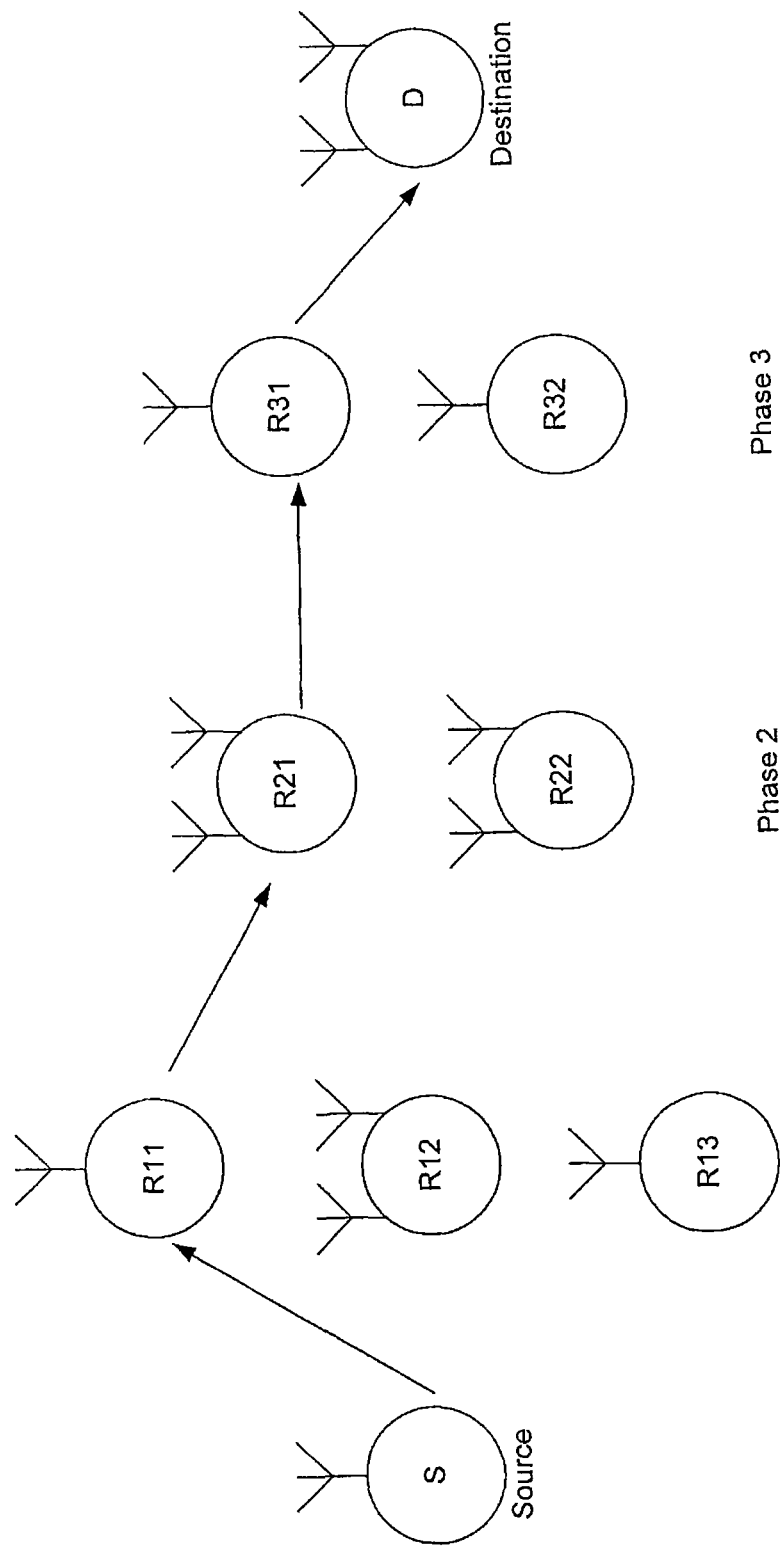
FIG. 8 illustrates a multi-hop relay network with a selected single relay path according to an embodiment.

The above described embodiments can be extended to select a relay route for relaying a signal from the source node to the destination node. For example, if two routes are available though the network, the route which minimises the end-to-end outage probability and/or satisfy some predetermined criteria subject to a constraint on the outage probability. Another example is a route with the lowest number of relay nodes can be chosen provided the end-to-end outage probability is satisfied. In another example, the fading processes are identical for every link, and the fading processes for multi-hop route, j=1, exhibits better statistical properties. Accordingly, the j=1 route, S-R11-R21-R31-D, is selected as shown in FIG. 7.

The above described embodiments circumvent processor intensive operations by utilising a separability property under regenerative and non-regenerative relay schemes. Furthermore, the above described embodiments utilise statistical information of the network parameters, such as channel transfer characteristics and average CINR (Carrier-to-interference-plus-noise ratio) to select an appropriate relay forwarding/reception method and a routing protocol. Thus, instantaneous knowledge of prevailing communications network conditions, such as instantaneous CINR and channel transfer coefficients, are not required. This is advantageous because the relay nodes in the network do not need to be updated with such information, and as such the overhead of the network can be significantly reduced.

While certain embodiments have been described, these embodiments have been presented by way of example only, and are not intended to limit the scope of the inventions. Indeed, the novel methods, devices, and systems described herein may be embodied in a variety of other forms; furthermore, various omissions, substitutions and changes in the form of the methods, devices, and systems described herein may be made without departing from the spirit of the inventions. The accompanying claims and their equivalents are intended to cover such forms or modifications as would fall within the scope and spirit of the inventions.

The invention claimed is:

1. A method of selecting a mode for relaying a multi-hop signal in a wireless communications network, the wireless communications network comprising a plurality of wireless devices, the method being performed by at least one of said wireless devices to relay a signal in a communication path between one of said plurality of wireless devices and another one of said wireless devices, the method comprising:

receiving a signal from said one of said plurality of wireless devices;

determining channel fading distribution information relating to a part or a whole of said wireless communications network;

selecting a mode of relaying said signal from a plurality of predetermined relay modes based on said determined channel fading distribution information, such that an outage probability for said communication path satisfies a predetermined condition; and transmitting said signal to said another one of said plurality of wireless devices using said selected mode.

2. A method according to claim 1, wherein said selecting said mode of relaying said signal is performed such that at least one parameter of said wireless communications network is optimised, subject to a constraint on the outage probability.

3. A method according to claim 1, wherein there is provided at least one further communication path to relay said signal from said one of said plurality of wireless devices to said another one of said plurality of wireless devices, the method further comprising the step of selecting said at least one further communication path if said at least one further communication path satisfy a further predetermined condition, subject to a constraint on the outage probability.

4. A method according to claim 1, further comprising performing a joint relay with a yet further one of said plurality of wireless devices based on a confidence level defining whether the outage probability for said communication path to satisfy said predetermined condition can be maintained by said at least one of said wireless devices.

5. A method according to claim 4, further comprising determining a delay based on said confidence level, wherein said delay defines a time interval in which said at least one of said wireless devices decides whether said joint relay with said yet further one of said plurality of wireless devices is required.

6. A method according to claim 1, wherein said mode of relaying said signal includes any one of the following modes:
   (a) maximum ratio transmission or reception combining;
   (b) radio frequency or digital beamforming;
   (c) localised or distributed space-time coding; or
   (d) repetition coding.

7. A computer program product comprising computer executable instructions which, when executed by a computer, are operable to cause said computer to perform a method according to claim 1.

8. A computer program product according to claim 7, wherein the computer program product is a non-transitory a computer readable storage medium.

9. A relay device for selecting a mode for relaying a signal in a multi-hop wireless communications network, the multi-hop wireless communications network comprising a plurality of wireless devices, the relay device being configured to relay said signal in a communication path between one of said plurality of wireless devices and another one of said plurality of wireless devices, the relay device comprising:
   a receiver to receive a signal from said one of said plurality of wireless devices;
   a circuit to determine channel fading distribution information relating to a part or a whole of said wireless communications network;
   a selector to select a mode of relaying said signal from a plurality of predetermined relay modes based on said determined channel fading distribution information, such that an outage probability for said communication path satisfies a predetermined condition; and
   a transmitter to transmit said signal to said another one of said plurality of wireless devices using said selected mode.

10. A relay device according to claim 9, wherein said selector is configured to select a mode of relaying said signal such that at least one parameter of said wireless network is optimised subject to a constraint on the outage probability.

11. A relay device according to claim 9 or claim 10, wherein there is provided at least one further communication path to relay said signal from said one of said wireless devices to said another of said plurality of wireless devices, said selector is configured to select said at least one further communication path if said at least one further communication path satisfy a further predetermined condition subject to a constraint on the outage probability.

12. A relay device according to claim 9, wherein the relay device is further configured to perform a joint relay with a yet further one of said plurality of wireless devices based on a confidence level defining whether the outage probability for said communication path to satisfy a predetermined condition can be maintained by said relay device.

13. A relay device according to claim 12, wherein the circuit is further configured to determine a delay based on said confidence level, wherein said delay defines a time interval in which said relay device decides whether said joint relay with said yet further one of said plurality of wireless devices is required.

14. A relay device according to claim 9, wherein said mode of relaying said signal includes any one of the following modes:
   (a) maximum ratio transmission or reception combining;
   (b) radio frequency or digital beamforming;
   (c) localised or distributed space-time coding; or
   (d) repetition coding.

15. A wireless communication system for selecting a mode comprising a plurality of multi-hop wireless devices, wherein at least one of said plurality of wireless devices is operable to relay a signal between one of said plurality of wireless devices and another one of said plurality of wireless devices over a communication path, and said at least one of said wireless devices comprises:
   a receiver to receive a signal from said one of said plurality of wireless devices;
   a circuit to determine channel fading distribution information relating to a part or a whole of said wireless communications network;
   a selector to select a mode of relaying said signal from a plurality of predetermined relay modes based on said determined channel fading distribution information, such that an outage probability for said communication path satisfies a predetermined condition; and
   a transmitter to transmit said signal to said another one of said plurality of wireless devices using said selected mode.

* * * * *